Jan. 22, 1946.  J. G. HOOLEY  2,393,469
FLUORESCENT GLASS AND LAMP MADE THEREFROM
Filed Aug. 3, 1942
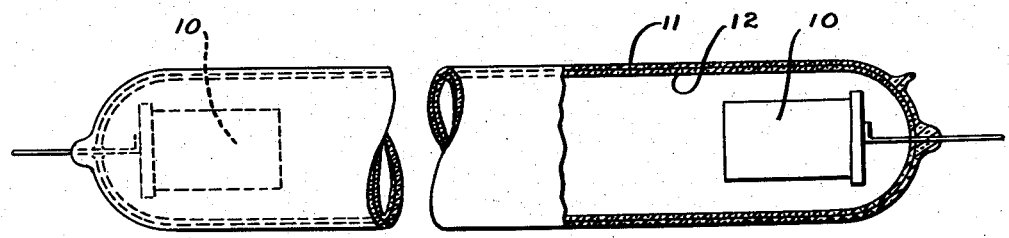
Inventor
JOSEPH GILBERT HOOLEY
By F. N. Knight
Attorney

UNITED STATES PATENT OFFICE 2,393,469

FLUORESCENT GLASS AND LAMP MADE THEREFROM

Joseph Gilbert Hooley, Corning, N. Y., assignor to Corning Glass Works, Corning, N. Y., a corporation of New York Application August 3, 1942, Serial No. 453,445

1 Claim. (Cl. 176—122)

This invention relates to fluorescent glasses and to discharge devices or lamps enclosed thereby, in particular, lamps containing mercury vapor under low pressure. The low pressure mercury vapor arc is well known as a source of ultra-violet light by the radiations therefrom are very rich in short wave lengths (254 m$\mu$) and substantially free from radiations in the near ultra-violet (300–400 m$\mu$).

It is the object of this invention to produce ultra-violet radiations of wave lengths 300–400 m$\mu$.

Another object is to produce a glass which will convert radiations having a wave length of about 254 m$\mu$ to wave length of about 300–400 m$\mu$.

Another object is to produce wave lengths of 300–400 m$\mu$ in a substantial amount from a low pressure mercury arc.

A further object is an electric discharge device embodying a low pressure mercury arc which will produce substantial radiation between 300 and 400 m$\mu$.

To these and other ends the invention comprises the method, the glass and the lamp hereinafter described and particularly pointed out in the claim.

I have discovered that cerium suboxide ($Ce_2O_3$) in a phosphate glass is excited to fluorescence by short wave lengths such as 254 m$\mu$, but that its fluorescence is in the ultra-violet between wave lengths 300 and 400 m$\mu$ and that substantially no visible fluorescence is produced. In other words, a phosphate glass containing cerium as the sole fluorescing agent and melted reducingly will fluoresce only in the near ultra-violet when irradiated with wave lengths in the neighborhood of 254 m$\mu$. Broadly, my new glasses comprise 50–80% $P_2O_5$, 15–40% RO (total second group oxides), at least 5% $Al_2O_3$ and 2–6% $Ce_2O_3$, the molecular ratio of $P_2O_5$ to total second group oxides being not more than 4 and the glass being melted reducingly. The following compositions in weight percentage are examples of glasses falling within the scope of my invention:

|  | 1 | 2 | 3 | 4 | 5 | 6 | 7 |
|---|---|---|---|---|---|---|---|
| $P_2O_5$ | 51.8 | 65 | 65 | 69.8 | 69.9 | 77.6 | 69.9 |
| CaO |  | 25 |  | 9.6 | 14.3 | 13.5 |  |
| BaO | 38.2 |  |  |  |  |  | 19.1 |
| ZnO |  |  | 25 |  |  |  |  |
| MgO |  |  |  | 9.6 |  |  |  |
| BeO |  |  |  |  |  | 4.8 |  |
| $Al_2O_3$ | 5.7 | 5.7 | 5.7 | 6.7 | 6.7 | 5.8 | 6.7 |
| $Ce_2O_3$ | 4.3 | 4.3 | 4.3 | 4.3 | 4.3 | 3.1 | 4.3 |
| Mol ratio $P_2O_5$/RO | 1.46 | 1.03 | 1.46 | 1.19 | 1.1 | 2.26 | 4.0 |
| Fluorescence value 300–400 m$\mu$ | 130 | 127 | 59 | 82 | 84 | 100 | 66 |

The above glasses must be melted reducingly by the addition of a reducing agent such as sugar or carbonaceous materials to the batch because $CeO_2$ is non-fluorescent.

The molecular ratio of $P_2O_5$ to RO is obtained by dividing the weight percentages of $P_2O_5$ and of the individual second group oxides by their respective molecular weights and dividing the value thus obtained for $P_2O_5$ by the value or sum of the values obtained for the second group oxide or oxides. When this ratio exceeds 4, the ultra-violet fluorescence is low and the glass is otherwise unsatisfactory.

The fluorescence values given above are galvanometer readings obtained by powdering the glass, irradiating the powder with the light of a low pressure mercury arc and allowing only the fluorescence therefrom to impinge on a photoelectric cell after passing through a suitable light filter to exclude wave lengths other than 300–400 m$\mu$, the photoelectric cell being connected to a galvanometer. As a standard of reference, powdered calcium tungstate of high fluorescence in the near ultra-violet was employed and the intensity of the irradiating light was calibrated or adjusted by rheostat to give a convenient galvanometer reading with the calcium tungstate after which the powdered glass samples were tested, using the same light intensity. The above recited values are based on a reading of 40 for the calcium tungstate. When other light filters were employed which could transmit only the visible blue, green or red light respectively, the galvanometer readings were substantially zero. In contrast to this, cerium in a silicate glass produces little if any ultra-violet fluorescence. From the above it will be seen that the fluorescence of the new glasses in the near ultra-violet amounted to as much as three times that of the standard.

It will be further seen that a low pressure mercury arc surrounded by an envelope comprising such glasses will produce a substantial amount of radiations in the near ultra-violet. To fabricate such a lamp I find it advantageous to employ the above fluorescent glasses as a thin layer flashed to the inner surface of a tube or bulb composed of a silicate glass capable of transmitting wave lengths between 300 and 400 m$\mu$. I may also grind the fluorescent glass to a powder and apply the powder as an interior surface coating to a silicate glass tube of such type in the manner well known in this art.

As an example of a low pressure mercury arc lamp made in accordance with my invention, reference is had to the accompanying drawing which is a side view partly in section of a low pressure mercury discharge tube provided with electrodes 10 and a filling of mercury vapor under low pressure, the tube being composed of an outer layer of silicate glass 11 and an inner layer 12 of phosphate glass containing cerium suboxide as the sole fluorescing agent.

What I claim is:

An envelope for a mercury vapor arc lamp comprising a silicate glass envelope having on its inner surface a transparent vitreous layer of a phosphate glass which consists of $P_2O_5$, $Al_2O_3$, $Ce_2O_3$, and an oxide of a metal of the second periodic group having an atomic weight not exceeding 138, the ratio of $P_2O_5$ to second group oxide being greater than 1 but not greater than 4.

JOSEPH GILBERT HOOLEY.